Dec. 10, 1957  D. E. FORD ET AL  2,815,887
CONTAINER LINER
Filed Jan. 17, 1956
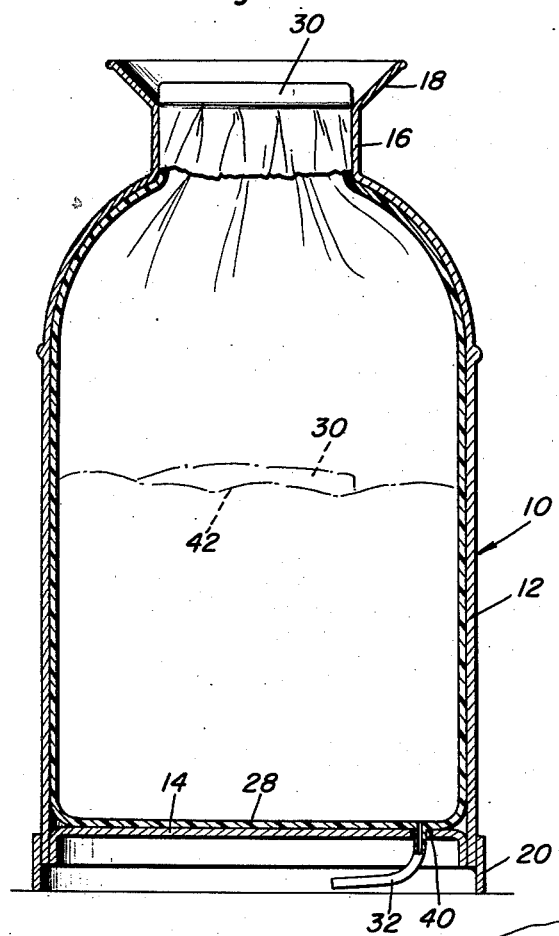
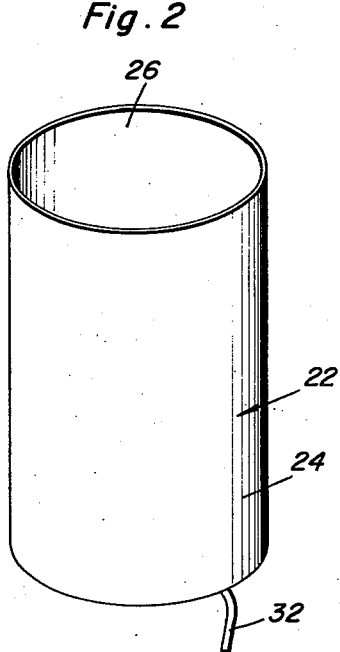
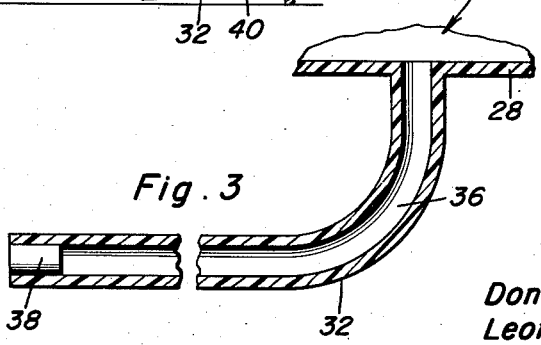
Don E. Ford
Leona P. Ford
INVENTORS.

sign Patent Office  
2,815,887  
Patented Dec. 10, 1957

2,815,887

CONTAINER LINER

Don E. Ford and Leona P. Ford, Council Bluffs, Iowa

Application January 17, 1956, Serial No. 559,635

2 Claims. (Cl. 222—105)

The present invention relates to dispensing liquid and particularly to the dispensing of liquid which must be maintained under reasonably high sanitary conditions.

Although the present invention is useful in dispensing many types of liquids, it is primarily useful in connection with the dispensing of milk or other liquid food products. Accordingly, the description to follow shall be in connection with the dispensing of milk, although it is understood that the principles of the invention may be applied to the dispensing of other liquids.

At the present time milk is dispensed throughout the country in milk containers that have a flexible tube extending from a hole in the lower portion of a can, this tube being attached on a nipple that is carried by the can. The only seal for the milk in the can is the lid, which must necessarily remain open or at least vented, so that the milk may properly flow from the stem at the bottom. This has caused concern in various sanitation boards in that the admission of air at the top of the milk accelerates the growth of harmful bacteria in the milk. Accordingly, an object of this invention is to provide a liner for a milk can, the liner being so constructed that no air is admitted therein, there is no coupling connection between the discharge conduit at its lower end, this being a source of considerable contamination possibility, and the liner being of flexible material, preferably one of the commercial plastics, whereby due to minimal cost it is disposable and whereby due to its high flexibility characteristic the sealed top thereof follows the liquid level down as the milk is drawn from the discharge conduit.

A further object of the invention is to provide a one-piece liner of highly flexible material, such as a film of plastic, the liner being shaped to fit the contours of the interior of a milk can and having a discharge conduit integrally connected with it in its lower end, whereby the liner may be placed in an ordinary milk can to prevent contact of the milk with anything other than the material of the flexible plastic liner from the time that the milk in its liner is placed in the milk can until the milk is drawn therefrom and placed into another container for ultimate consumption, for example a glass or cup.

One of the important features of this invention is the single piece liner and discharge conduit which obviates the necessity of having any coupling connection between the discharge conduit and the liner, this coupling connection being avoided inasmuch as this is a source of contamination. Another very important feature of this invention is the arrangement where it is possible to exclude the air from the liner after the milk is placed in it, as by squeezing the liner slightly to purge the air through the top or by completely filling the liner with milk prior to sealing the top permanently. By permanently it is meant that there is no vent opening at the top of the liner, reliance being had on the collapsing of the top part of the liner as milk is drawn from the discharge conduit. In this way the liner recedes in the milk can together with the liquid level, atmospheric pressure being applied to the top surface of the liner instead of the top surface of the liquid in the liner during the discharge of milk therefrom.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a longitudinal sectional view of a standard, typical milk can having a liner made in accordance with the teachings of the invention located therein;

Figure 2 is a perspective view of the liner prior to the sealing of the top thereof; and Figure 3 is an enlarged fragmentary sectional view showing the integral connection between the liner and the discharge conduit.

The standard milk can 10 is made of a cylindrical side wall 12 having a bottom 14 and a neck 16 at the open top thereof. The bell 18 at the upper end of the neck is used for the accommodation of a closure. In constructing the milk can 10 the bottom 14 is welded or otherwise rigidly secured to the side wall 12, and there is a collar 20 fixed, as by spot welding or by other standard means, to the side wall 12, this collar functioning as a support for the milk can.

A liner 22 is disposed in the milk can 10 and is preferably made of a plastic material selected from the numerous commercially available plastics. It is estimated that there are several thousand synthetic resinous materials which possess the necessary characteristics of flexibility, low initial cost and liquid resistance. Some are ethylene resins (polyethylene), melamine resins, acrylic resins, cellulose acetate, some phenolic resins, some vinyl and urea resins. These are but a few and it is for this reason that it is intended that these be considered as mere examples rather than covering all possible plastics.

Liner 22 is shaped to conform to the interior of the can 10 and has a cylindrical side wall 24, an open top 26 and a bottom 28. The open top 26 is for receiving milk as it is poured into the liner. After filling with milk the liner is purged of air, as by being completely filled or as by bringing the opposite sides of the side wall 24 together and in this way excluding air. Then, the open top of the liner 22 is sealed by a standard sealing expedient. Heat sealing is preferred inasmuch as no solvent or cement is required. Many of the commercially available plastics are heat sealable by merely running a warm or hot iron over two plies of the plastic material. This is suggested for forming the closed end 30 of the liner 22.

At the lower part of the liner 22, for example in the bottom 28 or in the lower part of side wall 24, there is an integrally connected liquid discharge conduit 22, the integral connection being made by having the liner and conduit 32 of a single manufacture or by having the conduit sealed with its passageway 36 in registry with the interior of the liner 22. Cementing or other fastening techniques may be adopted in this regard. The outer end of conduit 32 is closed, as by having a plug 38 therein or by having the end sealed in another fashion.

In use there is an aperture 40 in the lower part of the can 10, for example in the bottom 14 thereof. Liner 22 is fitted in the can with the conduit 32 extending through aperture 40. Then the liner is filled with milk and the top sealed as described previously. Inasmuch as the liner is highly flexible it has its sides and bottom supported by the inner surfaces of the can 10. Then, the conduit 32 is connected with a valve mechanism and the sealed outer end of the conduit is cut off. The valve mechanism may be a clamp of one type or another.

The top part of the can 10 is vented to the atmosphere, as by leaving the lid off the can or partially cracked open. Then upon withdrawing milk from the supply of milk in liner 22, the ambient pressure of the atmosphere is applied to the very flimsy liner 22 and at the top thereof. Accordingly, it follows the fluid level toward the bottom of the can 10, a second position of fluid level being shown in phantom in Figure 1. The cross sectional area of passage 36 is made small so that dispensing liquid from the liner 22 there is no back flow of air thereinto.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A milk can having side walls, a bottom, a top exposable to ambient atmospheric pressure and a passageway in the bottom part of the can, a disposable liner in said can and made of a highly flexible and flimsy material, said liner having an open top through which to fill said liner and after which said liner is purged of air and permanently sealed to prevent the entry of air into the liner, a milk discharge conduit connecting with the lower part of the interior of said liner to draw milk therefrom, and passing through said passageway in said can, said liner having walls and a bottom supported by the inner surfaces of said walls and bottom of the milk can, and said walls of said liner being sufficiently flexible to collapse and follow the milk level toward said liner bottom.

2. The milk can of claim 1 wherein said liner and its conduit are of one piece construction, said conduit has a closed disposable outer end, and the conduit is of a sufficient length after insertion in said passageway to enable the disposable outer end to be cut off and leave a permanently open portion of the conduit through which to discharge the milk.

References Cited in the file of this patent

UNITED STATES PATENTS

| 50,085 | Byrne | Sept. 19, 1865 |
| 2,698,703 | Harvey | Jan. 4, 1955 |

FOREIGN PATENTS

| 181,214 | Germany | Feb. 5, 1907 |